Jan. 20, 1970   M. A. SWANSON   3,490,794
EXHAUST MANIFOLD JOINTS
Filed June 28, 1968
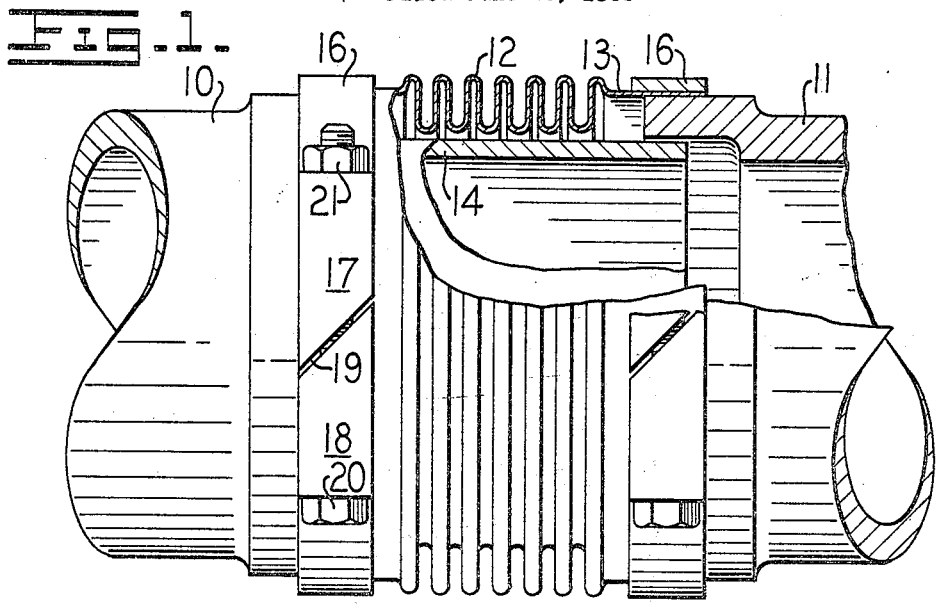
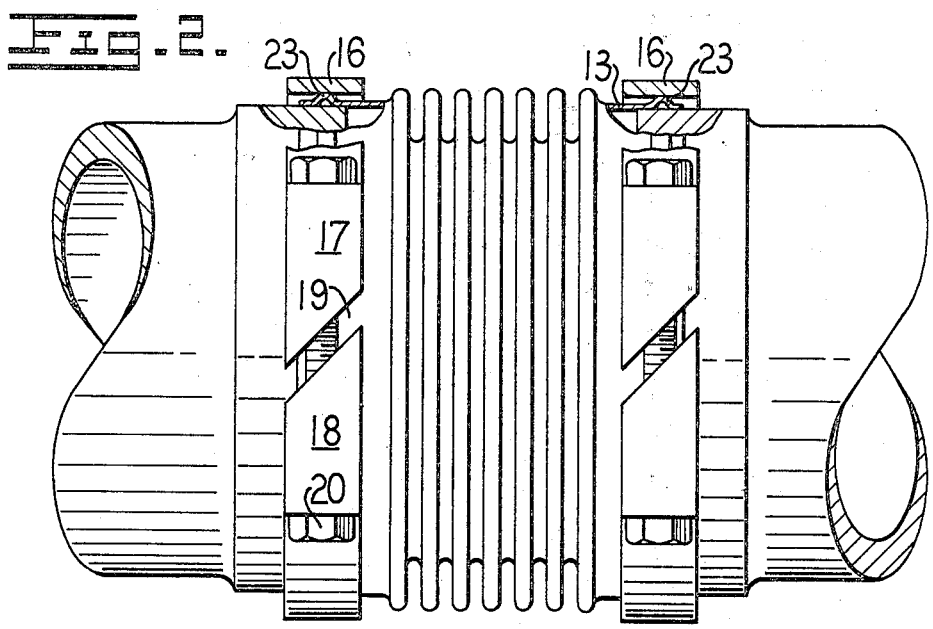
INVENTORS
MORRIS A. SWANSON
BY
ATTORNEYS

# United States Patent Office 3,490,794
Patented Jan. 20, 1970

3,490,794
EXHAUST MANIFOLD JOINTS
Morris A. Swanson, Washington, Ill., assignor to Caterpillar Tractor Co., Peoria, Ill., a corporation of California
Filed June 28, 1968, Ser. No. 741,169
Int. Cl. F16l 25/00; F16l 55/00, 21/00
U.S. Cl. 285—173                               2 Claims

ABSTRACT OF THE DISCLOSURE

A connecting means between a relatively ductile metal expansible tube and a relatively hard cast metal tube in which the ductile tube is pressed into contact with the cast tube and the ductile tube has a narrow bead in the area which is pressed to enable it to be deformed into conformity with the irregularities of the cast metal surface to make a fluid tight connection.

---

The present invention was developed for use in connection with the exhaust manifold of internal combustion engines but may find use in other environments as well. Difficulties are experienced in exhaust manifolds which are generally made of cast iron or similar material because of the fact that they are subject to very great variations in temperature and upon expansion and contraction are subject to distortion and breakage as well as manifold gasket damage. It has been the practice particularly on large engines to make manifolds in sections and to use an expansible device such as a sliding coupling or bellows between the sections, thus reducing the possibility of damage which results from expansion and contraction. Sliding connections between the manifold parts have proven unsatisfactory largely because it is difficult to attain a perfect seal and gas leakage is experienced. Bellows have proven desirable for expansion members but several methods employed to connect them with the cast iron manifold sections have proven costly.

The present invention employs bellows as an expansible member and it is the object of the invention to provide an inexpensive but very secure means of connecting the bellows to the cast iron sections and one which insures against leakage without the necessity of costly machining operations or other costly fastening means. Further objects and advantages of the invention and the manner in which it is carried into practice are made apparent in the following specification wherein reference is made to the accompanying drawing.

In the drawing:

FIG. 1 is a view partially in elevation and partially in section showing the ends of two cast manifold sections connected by an expansion joint using connecting means embodying the present invention; and FIG. 2 is a view in elevation of the same joint with parts in section and showing the relationship of the parts before assembly is completed.

In the drawing, the ends of two cast iron manifold sections are represented at 10 and 11 and are shown as connected together by an expansible bellows-type member 12 which has tubular ends, one of which is shown at 13 in FIG. 1 slidable over the ends of the manifold sections 10 and 11. A piece of protective tubing shown at 14 is slidably fitted within the ends of the manifold sections and serves to protect the corrugations of the bellows from an accumulation of carbon or other waste products in the exhaust gases and also to prevent excessive turbulence of flow as the exhaust gases pass through the manifold.

The tubular ends 13 of the expansible element are clamped in place by annular clamps 16, each having lugs 17 and 18 separated by a diagonal slot 19. Lugs 17 and 18 are drilled for reception of a bolt 20 which extends through and has a nut 21 which when tightened draws the ends of the clamp toward each other and compresses the tubular end 13 of the expansible member into tight contact with the end of the exhaust section to which it is connected.

One of the advantages of the present invention resides in the diagonal arrangement of the slot 19 which serves to prevent distortion or gathering up of the tubular part 13 as the clamp is tightened. Another advantage resides in the provision of an annular crimped area in the part 13 beneath the clamps 16 as is illustrated most clearly at 23 in FIG. 2. Because of this crimp in the metal, substantially greater pressure is imparted in this area as the clamps are tightened and because the metal is somewhat softer than that of the castings, it is caused to conform to irregularities in the harder surface of the castings and a perfect fluid tight seal is accomplished.

What is claimed is:

1. Connecting means between a first tubular member of hard metal and a second tubular member of softer metal surounding the first member comprising an annular clamping means pressing the second member into contact with the first, and a bead-like formation surrounding the second member beneath the clamping means to enable it to be deformed to fit irregularities in the shape of the first member to provide a fluid tight connection said formation comprising an area of U-shaped cross-section circumscribing the tubular member of softer metal and projecting radially outwardly therefrom beyond the normal diameter thereof.

2. The connecting means of claim 1 in which the annular clamping member has two ends shaped to receive threaded means for drawing them toward each other and terminating on parallel diagonal planes which overlie and extend diagonally across said bead-like formation.

References Cited

UNITED STATES PATENTS

| | | | |
|---|---|---|---|
| 1,738,915 | 12/1929 | Mueller | 285—173 |
| 2,185,725 | 1/1940 | Elliott | 285—173 |
| 2,936,186 | 5/1960 | Dunmire | 24—179 X |
| 3,261,577 | 7/1966 | Gryse et al. | 24—179 X |

DAVID J. WILLIAMOWSKY, Primary Examiner

W. L. SHEDD, Assistant Examiner

U.S. Cl. X.R.
285—226, 329, 382, 417, 420